Jan. 3, 1967   T. E. BELSHAW ET AL   3,295,435
DOUGHNUT FRYING MACHINE
Original Filed Aug. 19, 1963   2 Sheets-Sheet 1
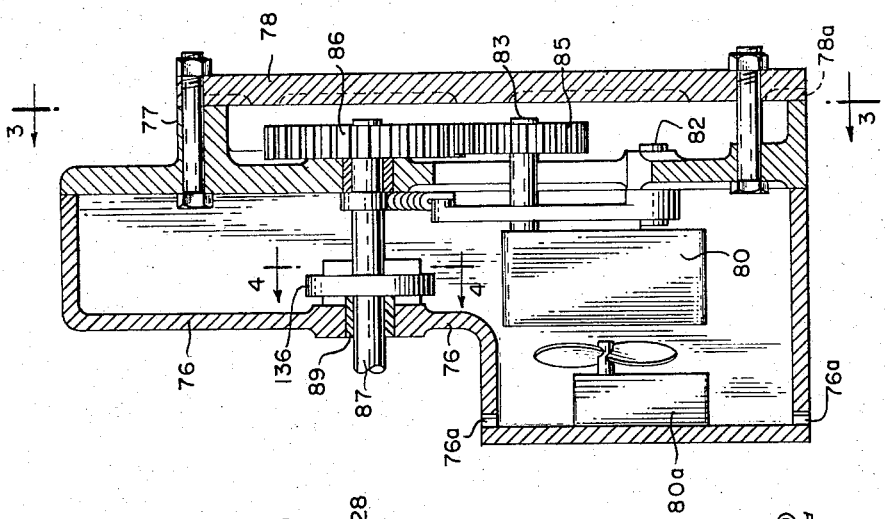
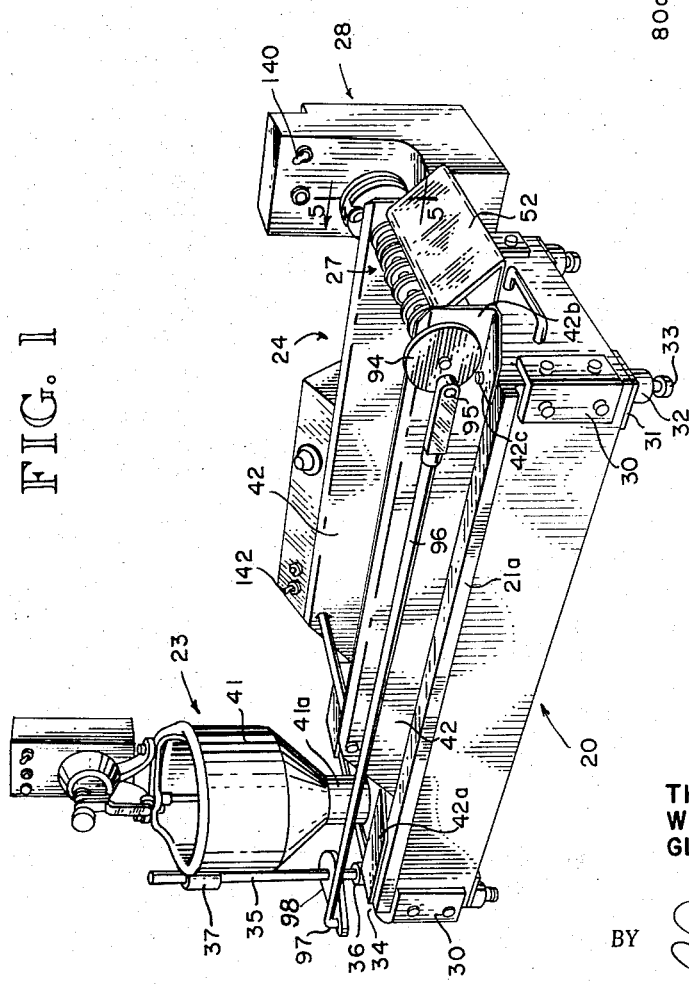
THOMAS E. BELSHAW
WILBUR D. WILKE
GLENDON H. SCOTT
*INVENTORS*
BY *Seed & Berry*
ATTORNEYS Jan. 3, 1967     T. E. BELSHAW ET AL     3,295,435
DOUGHNUT FRYING MACHINE Original Filed Aug. 19, 1963     2 Sheets-Sheet 2

THOMAS E. BELSHAW
WILBUR D. WILKE
GLENDON H. SCOTT
              INVENTORS

BY Seed & Berry

ATTORNEYS

UNITED STATES PATENT OFFICE 3,295,435
DOUGHNUT FRYING MACHINE
Thomas E. Belshaw, Wilbur D. Wilke, and Glendon H. Scott, Seattle, Wash., assignors to Belshaw Brothers, Incorporated, Seattle, Wash., a corporation of Washington
Original application Aug. 19, 1963, Ser. No. 302,894. Divided and this application Oct. 15, 1965, Ser. No. 496,557
3 Claims. (Cl. 99—405)

This invention is a division of application Serial No. 302,894, filed August 19, 1963.

This invention relates generally to cooking machines of the type in which bodies to be cooked are fed into a tank of hot cooking liquid and are conveyed through the tank as they cook, and more particularly to automatic doughnut frying machines in which dough rings are cut and dispensed at predetermined intervals into hot fat or oil, are conveyed therethrough while frying, and are then discharged.

An object of this invention is to provide an automatic doughnut frying machine which is not damaged if the mechanism becomes jammed and which automatically sounds a warning in such an instance.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 1 is a perspective view of a frying machine embodying the present invention.

FIG. 2 is a vertical sectional view through the case of the drive unit.

Figure 3:
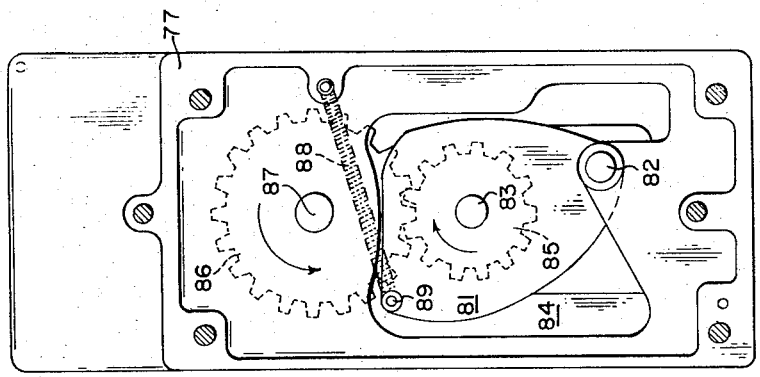
FIG. 3 is a vertical sectional view taken as indicated by line 3—3 in FIG. 2.

Referring to the drawings it is seen that in general the illustrated embodiment of the invention has a tank assembly comprising a rectangular base frame 20 in which is seated a removable fryer tank 21 for holding fat and having a removable heating assembly 22 for the fat. A detachable motor-driven dough cutter 23 is swingably mounted at the rear of the base frame and is timed for dispensing dough charges into the tank, alternately from side to side. These dough charges are carried forwardly in the hot fat, turned over about half way through their travel, and discharged at the front of the tank by a removable conveyor unit 24 which includes a cooking flight conveyor, a turner, and a drain conveyor. The conveyor unit is detachably coupled to a drive unit 28 in turn mounted on the base frame 20 near the front. The dough cutter and the elements of the conveyor and heating assembly are described in copending application Serial Number 302,894, filed August 19, 1963, the pertinent portions of which are incorporated herein by reference.

Continuing to a detailed description of these various components of the fryer, the base frame 20 is a tank-like outer case open at the top to receive the tank 21 which has an outturned marginal lip 21a resting on the top of the frame. At the corners the base frame has exterior stiffening angles 30 and bottom pads 31 from which depend legs 32 with adjustable leveling feet 33. The left front angle has the drive unit 28 mounted thereon while the right rear angle is formed with a vertically spaced pair of back eye extensions 34 providing a turn socket for the base of the column 35. This column has an adjustable collar 36 resting on the upper extension and at its upper end has an adapter sleeve 37 with an upstanding non-circular pin 38 for receiving a mating eye presented by a rim piece 40 on the hopper 41 of the dough cutter 23.

The conveyor unit 24 has a pair of longitudinal upright cheek plates 42—42 which have upper rear portions bent laterally out to form back support flanges 42a, and at the front the cheek plates have forward extensions 42b formed by cutouts at the lower front corners of the plates. It will be noted that the material from the upper portion of these cutouts is bent outwardly along the lower edge of the extensions 42b thereby forming flanges 42c coplanar with the flanges 42a. As can be seen in FIG. 1, the flanges 42a and 42c rest on the tank lip 21a to support the cheek plates in inwardly spaced relation from the longitudinal side walls of the tank and spaced above the bottom of the tank.

The drive unit 28 comprises a case 76 closed at the back by a gear box 77 in turn having a rear cover plate 78. An electric motor 80 is located in the base portion of the case proper and is carried by a swing plate 81 which is pivoted at its lower end to the front of the gear box 77 by a pin 82. The output shaft 83 of the motor 89 passes rearwardly through the swing plate 81 and through a cutout 84 in the gear box 77 to drive a pinion 85. Surmounting the latter is a gear 86 fixed on a forwardly projecting shaft 87 which is journaled in the case 76 above the motor 89. A tension spring 88 is anchored at one end to the case 76 and is hooked at its other end over a pin 89 at the top of the swing plate 81 to yieldingly pull the pinion 85 into mesh with the gear 86. By this arrangement, if the shaft 87 should become overloaded, the pinion 85 can back sufficiently out of mesh with the gear by swinging of the plate 81 in opposition to the spring 88 to permit the teeth of the pinion to pass the gear teeth. During this action the pinion teeth successively bang against the bottom stationary tooth of the gear as they pass so that the unit becomes a clacker, sounding a warning to the operator that the mechanism is jammed.

Since the electric motor 80 would otherwise tend to overheat during extended periods of operation, because of its confinement within the case 76, cooling and ventilation means are provided within the case 76 by a suitable electric fan unit 80a. In addition, ventilation ports 76a and 78a are provided in the case 76 and the plate 78 respectively. With this arrangement air is caused to circulate about the motor 80 and the interior of the case 76. It will be appreciated that the electric fan unit can be separately controlled by a manual switch, not shown, or may be a part of the motor circuit so as to insure operation during energization of the motor as a matter of choice.

Figure 5:
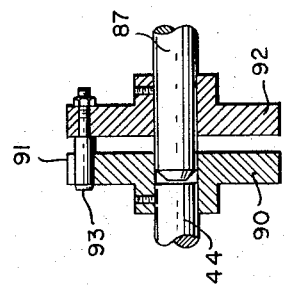
FIG. 5 is a detail sectional view taken on line 5—5 of FIG. 2.

A coupling plate 90, shown in detail in FIG. 5, with a radial peripheral slot 91 is fixed on the left end of the front shaft 44 for mating with a coupling plate 92 having an off-center projecting pin 93 adapted to extend into the slot 91. This latter coupling plate 92 is fixed on the forward end of the shaft 87. The other end of the front shaft 44 projects beyond the right cheek plate 42 and drives a crank plate 94 having its crank pin 95 journaled in the forward end of a connecting rod 96. At its rear end this rod is bent downwardly to provide a pintle 97 which extends into a journal formed at the free end of a lever 98 which is fixed on the column 35, as illustrated in FIGS. 1 and 3. With this arrangement the dough cutter 23 is swung from one side of the tank 21 to the other responsive to a half turn of the shafts 44 and 87. Thus when the connecting rod 96 is at its rearmost position the dough cutter overlies the right half of the tank and when the connecting rod reciprocates to its foremost position the dough cutter is positioned to discharge into the left half of the tank.

Figure 4:
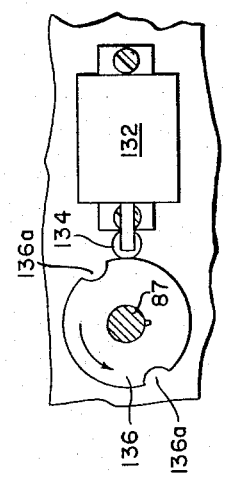
FIG. 4 is a detail sectional view taken as indicated by line 4—4 in FIG. 2.

As shown in FIGS. 2 and 4, a circular cam 136, having cutout portions 136a in the periphery, is axially fixed to shaft 87 for concurrent rotation with gear 86 and the front shaft 44. A microswitch 132 is mounted on the casing wall in proximity to the cam 136 such that its plunger follower 134 can ride on the cam periphery as the cam rotates. By suitable wiring and cam design, this switch arrangement can control a number of cooking machine functions in synchronism with the rotation of the front shaft 44 and gear 86 and selective actuation of the switch 132.

The frying machine of the present invention can be quickly dissassembled in units for cleaning without the use of any tools. Plug fittings are used on the electrical connections for the cutter motor 118 and related control circuit. Accordingly, at any time dough cutter 23 can be easily electrically disconnected and lifted free of the column 35. The rear end of the connecting rod 96 can be disconnected simply by lifting the pintle 97 from the lever 98 and then the entire conveyor unit 24 is free to be lifted from the tank 21 and cocked to uncouple the pin 93 from the slot 91. Disassembly can then be completed merely by lifting the heater 22 from the tank, and in turn lifting the tank out of the base frame 20.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What is claimed is:

1. In combination, a fryer tank; a conveyor means mounted in said tank and having a drive shaft on said tank comprising a gear casing, a first gear in said gear casing drivingly connected to said drive shaft, a swing plate pivotally connected to said gear casing, a second gear rotatably mounted on said swing plate to swing into and out of mesh with said first gear, spring means for releasably holding said swing plate in position for meshing of the first and second gears, and a motor mounted on said swing plate in driving connection with said second gear.

2. The combination of claim 1 wherein a first coupling plate is fixed on one end of said drive shaft; and wherein a second shaft extends from said first gear axially toward said coupling plate fixed on one end of said second shaft adjacent to said first coupling plate and releaseably pinned to said first coupling plate.

3. The combination of claim 1 including a cam mounted for concurrent rotation with said first gear and said drive shaft; and a microswitch actuatable by rotation of said cam.

References Cited by the Examiner

UNITED STATES PATENTS

| | | | |
|---|---|---|---|
| 2,286,013 | 6/1942 | Roth | 99—405 |
| 2,397,777 | 4/1946 | Colman | 74—409 |
| 2,513,217 | 6/1950 | Tomlines | 74—409 |

BILLY J. WILHITE, *Primary Examiner.*